United States Patent [19]

Cooper, Jr. et al.

[11] Patent Number: 4,639,994

[45] Date of Patent: Feb. 3, 1987

[54] SUSPENSION OF TOOLS FOR SLEEVING OF TUBES OF STEAM GENERATOR

[75] Inventors: Frank W. Cooper, Jr., Monroeville, Pa.; Bruce A. Howard, Seminole, Fla.; David A. Snyder, North Huntingdon, Pa.

[73] Assignee: Westinghouse Electric Corp., Pittsburgh, Pa.

[21] Appl. No.: 538,309

[22] Filed: Oct. 3, 1983

[51] Int. Cl.$^4$ .......................... B23P 7/00; B23P 15/26
[52] U.S. Cl. .................................... 29/402.01; 29/723; 29/727; 29/157.4; 269/24; 269/56; 269/48.1; 376/260
[58] Field of Search ................. 29/727, 726, 157.3 A, 29/157.3 B, 157.3 C, 402.08, 402.02, 157.3 R, 402.01, 723, 157.4, 402.03, 402.04, 402.05, 402.06, 402.09, 402.11, 402.19; 269/24, 56, 58, 59, 47, 48, 48.1, 48.2, 48.3; 376/260

[56] References Cited

U.S. PATENT DOCUMENTS 4,406,856 9/1983 Wilkins et al. ...................... 29/727

Primary Examiner—Howard N. Goldberg
Assistant Examiner—Vernon K. Rising
Attorney, Agent, or Firm—L. A. DePaul

[57] ABSTRACT

Apparatus for processing the damaged tubes of a steam generator either to prepare the tubes for insertion of a sleeve, or to insert a sleeve or to treat the sleeve after it is inserted. This apparatus includes a drilling tool for drilling out plugs, a sleeving tool for inserting sleeves in the tubes, a high-roller tool for rolling the sleeves at their upper ends where they have been expanded, and a low-roller tool for rolling the sleeves at their lower ends in the tube sheet. The sleeves are inserted in the tubes and are rolled by rolls driven by a hydraulic motor. For drilling, for sleeve insertion and for high and low rolling, the motor is controlled by a servo control valve.

3 Claims, 12 Drawing Figures

SUSPENSION OF TOOLS FOR SLEEVING OF TUBES OF STEAM GENERATOR

CROSS-REFERENCE TO RELATED APPLICATION

Application Ser. No. 538,320 filed concurrently herewith to Frank William Cooper, Jr. and John P. Vogeleer for "Sleeving of Tubes in Hostile Environments" and assigned to Westinghouse Electric Corporation is incorporated herein by reference (herein Cooper-Vogeleer).

BACKGROUND OF THE INVENTION

This invention relates to the art of repairing damaged tubes constituting part of a tube assembly. It has particular relationship to the repair, and specifically to the suspension of the tools which carry out the sleeving, of the damaged tubes which conduct the coolant of a steam generator of a nuclear-reactor plant. The damage to the tubes is predominantly corrosion. This invention has unique utility in the repair of the damaged or corroded tubes of steam generators of such plants. It may have more general use, and to the extent that its principles are used more generally, such use is regarded within the scope of equivalents of this application or of any patent which may issue on or as a result thereof.

Access to repair damaged tubes is obtained through manways in the channel head of a generator. A tube sheet extends across the channel head and the tubes are welded into the tube sheet and open into the channel head. The access region under the channel head is radioactive and it is essential that the presence of personnel in this region be minimized. In addition, the channel head is composed of metal. To preclude hazard to personnel, it is necessary that no conductors carrying power at commercial voltages (110 volts) or higher be present within the channel head. Conductors operating at about 24 volts or the like may be present.

The sleeving of the tubes involves several processes. In the past, plugs were inserted in the corroded tubes of a steam generator to prevent the flow of radioactive coolant into the steam or feedwater. The plugging of a tube reduces the efficiency of the generator by a magnitude corresponding to the relative quantity of coolant carried by the plugged tube. Substantial loss of efficiency, in some cases of the order of 15%, has been experienced in nuclear-reactor plants in which a large number of the tubes were plugged. To overcome this economic loss it has become necessary to drill out the plugs and sleeve the tubes. A tool to drill out plugged tubes is provided for this purpose. A tool is also provided for inserting the sleeve blanks into damaged tubes, those that are drilled out as well as others. Once a tube is sleeved, it is desirable to secure the sleeve in the tube and to seal the region between the sleeve and the tube against penetration of coolant or feedwater. This object is accomplished first by expanding the sleeve at its internal or upper end and in the portion of the sleeve in the tube sheet, i.e., at the lower end of the sleeve, and then by hard rolling the expanded sleeve at its rim and within the tube sheet. Expansion of the sleeve is disclosed in U.S. Pat. No. 4,513,506, granted Apr. 30, 1985 to John P. Vogeleer for "Measuring of Tube Expansion" and assigned to the Westinghouse Electric Corporation. The upper and lower hard rolling are carried out by tools each including a roller which is inserted in the sleeve after the sleeve has been inserted in the damaged tube. The tool for upper hard rolling is sometimes referred to as the high hard roller and the tool for the lower hard rolling is referred to as a low hard roller. Each of the tools whose function is described above is provided with locking pins by means of which it is firmly suspended from the tube sheet. The locking pins engage tubes in the sheet which are adjacent to a tube being sleeved.

It is an object of this invention to provide for the effective and reliable suspension of these tools from the tube sheet so that these tools may carry out their functions properly.

SUMMARY OF THE INVENTION

The processes for repairing damaged tubes are controlled by regulating the force applied by the hydraulic motors, to those of their associated tools requiring such regulations, by controlling the pressure impressed on the motors. The speed of the motors and of the mechanisms which they drive is regulated by controlling the fluid flow through the associated motors. This control of force and speed is effected through a hydraulic manifold whose operation is commanded and controlled by a computer through a hydraulic servo control unit (HSC). Such regulation and control is applied to the tool which inserts the sleeve, referred to as the sleeve inserter, the high and low hard rollers and the drill. In addition, the rate at which the drill penetrates into the plug is maintained constant.

It is essential that the locking pins by which each tool is suspended be properly seated in the tubes adjacent the tube to be processed. Each locking pin is inserted in an adjacent tube by a piston of a cylinder driven by the fluid. In accordance with this invention the manifold incorporates a dual-pressure circuit through which the locking pins are extended into the adjacent tubes by relatively low pressure, which may typically be 15 psi, on the associated pistons. The low pressure causes the locking pins to seat slowly in the tubes. Because the pressure is low, no damage occurs to a tool if an obstruction, for example a plug, exists in a tube into which an attempt is made to extend a locking pin, the extending operation stops. Once the locking pins are seated, the high-pressure circuit is tripped to lock the locking pins in place under high pressure so that they resist the reactive forces produced by the processing.

BRIEF DESCRIPTION OF THE DRAWINGS

For a better understanding of this invention, both as to its organization and as to its method of operation, together with additional objects and advantages thereof, reference is made to the following description, taken in connection with the accompanying drawings, in which.

DETAILED DESCRIPTION OF EMBODIMENTS AND METHOD

While the tools for repairing damaged tubes and their support are collateral to this invention, it is believed desirable to describe them to facilitate the understanding of this invention. The principle tools are the sleeve blank inserter, the lower hard roller and the upper hard roller. The drill for drilling out plugs is of secondary importance and will not be described in detail. The description follows.

Figure 1:
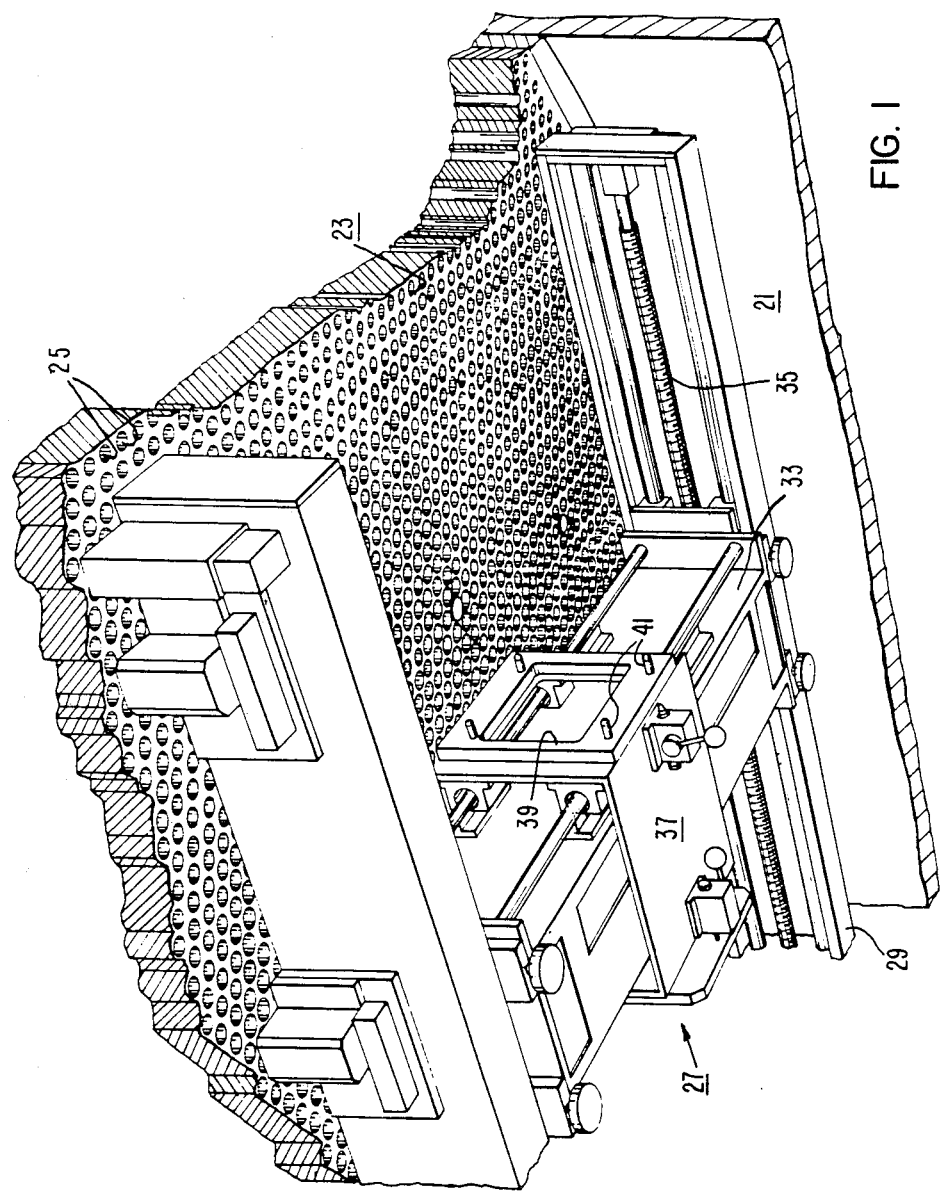
FIG. 1 is a copy of a photograph showing the manner in which the tools which carry out the processing of the damaged tubes are mounted within a channel head of a steam generator.

FIG. 1 shows a part of the interior of a channel head 21. A tube sheet 23 extends across the wall of the channel head. Throughout the sheet 23 there are tubes 25. To mount the tools for processing corroded tubes, a coordinate transport 27 is provided. The transport includes opposite parallel rails 29 and an opposite rail (not shown). The rails are secured by locking pins (not shown) in tubes 25 in the tube sheet 23. A bridge 33 is movable by screws 35 along the rails. A carriage 37 is movable along the bridge 33 in a direction perpendicular to the rails 29 and the one not shown. The carriage has a plate 39 provided with pins 41 from which the respective tools are suspended.

Figure 2:
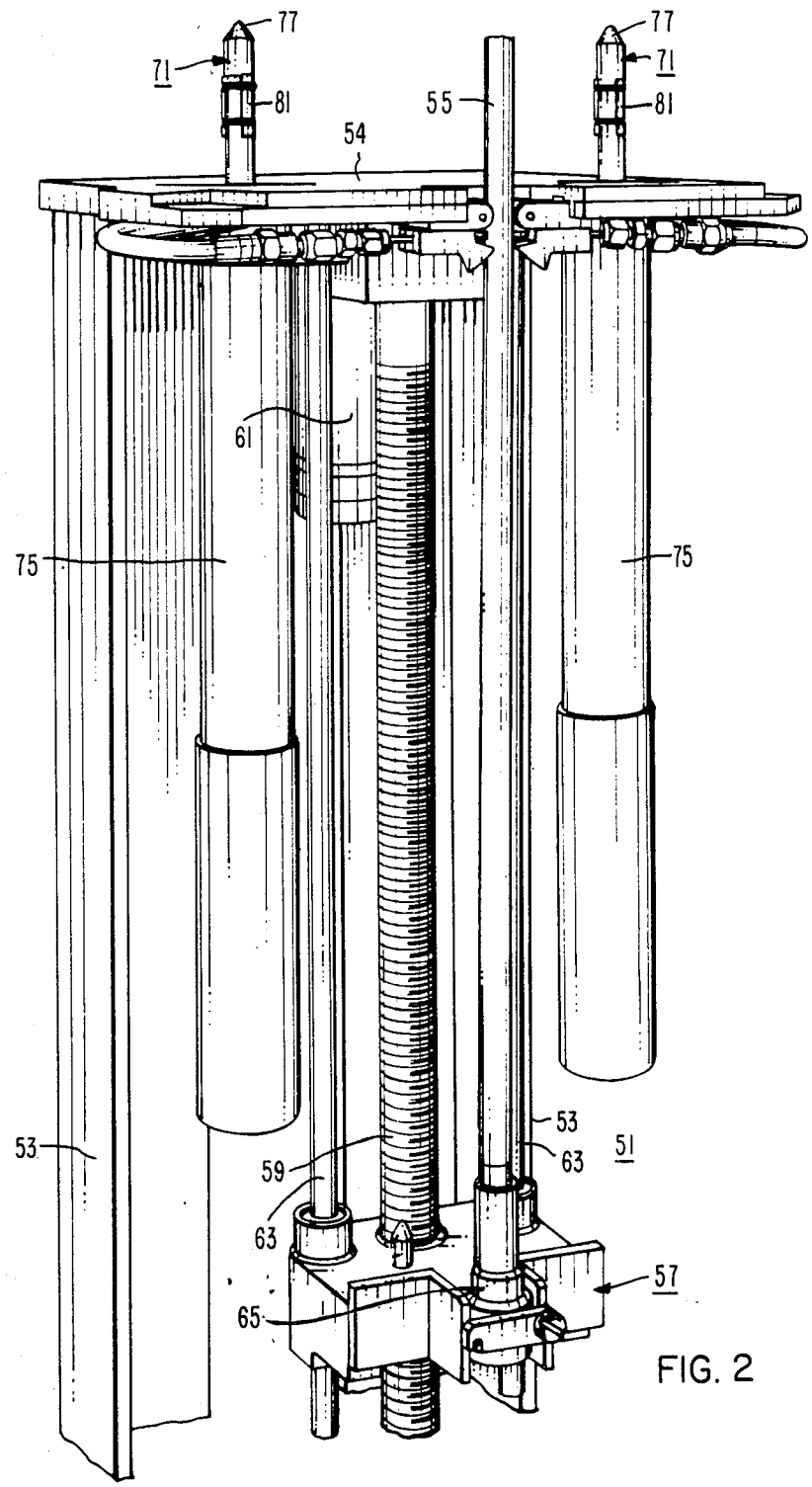
FIG. 2 is a copy of a photograph showing a sleeve blank insertion tool used in the practice of this invention with the mandrel which carries the sleeve retracted.
Figure 3:
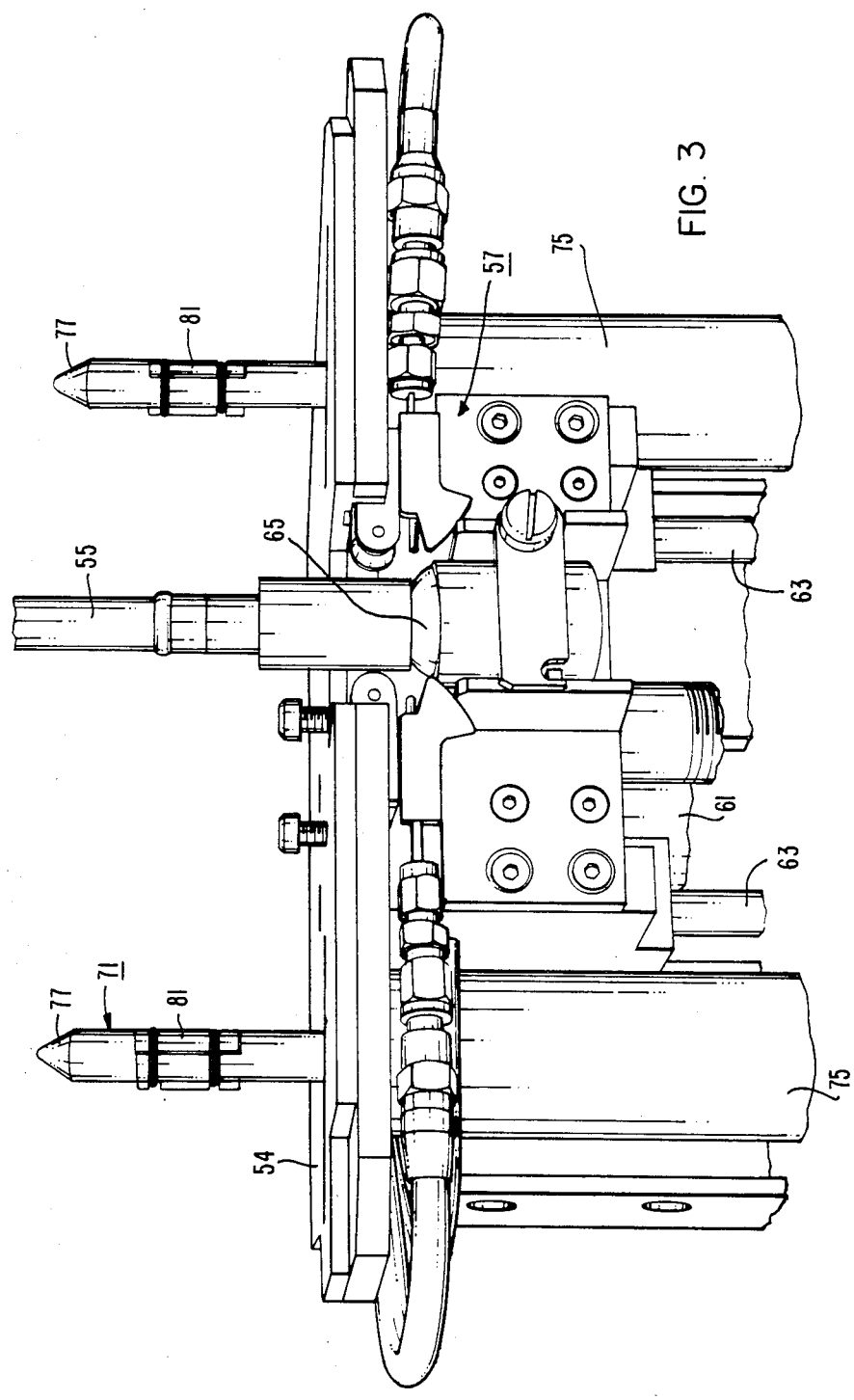
FIG. 3 is a copy of a photograph of this insertion tool with the mandrel in the uppermost position.

The inserter 51 (FIGS. 2, 3) for the sleeve blank 52 (FIG. 10A) includes a frame consisting of channels 53 to the top of which a plate 54 is secured. The plate 54 supports a vertical plate (not shown). The inserter is mounted on plate 39 of the carriage 37 (FIG. 1) by means of this vertical plate. The sleeve blank is mounted on a mandrel 55 which is carried by a bracket or carriage 57. The mandrel 55 and sleeve blank are raised and lowered by a lead screw 59 which is driven by a hydraulic motor 61 mounted on the angles 53 behind the mandrel 55 and lead screw 59. The bracket 57 contains a ball nut (not shown) which engages the lead screw 59. When the motor 61 rotates the lead screw 59, the bracket 57 is moved, on guide rods 63, vertically upwardly or downwardly, depending on the direction of rotation of the motor carrying the mandrel and sleeve blank 52 with it. At the top the bracket 57 has a nipple 65 (FIG. 3). When the bracket is in the uppermost position, the nipple engages a cooperative member (not shown) which connects the inside of the mandrel to a high pressure fluid source (usually water). The water is transmitted through the mandrel to expand the upper portion of the sleeve and the lower portion within the tube sheet 23 after the sleeve blank is inserted in a tube 25. The surface of the expanded sleeve engages the contiguous wall of the tube. After the expansion the sleeve is disengaged from the mandrel, the motor 61 is reversed, and the mandrel is withdrawn. The engagement of the sleeve 52 with the tube 25 where the sleeve is expanded prevents the sleeve from falling out of the tube 25. Typically, the upper end of the sleeve is expanded along a length of about 15¼ centimeters.

The sleeve inserter 51 (and also the other tools) includes locking pins 71. The pins 71 are moved upwardly and downwardly by piston rods 73 (FIG. 10A) of hydraulic cylinders 75. In the retracted position, the tips 77 of the pins 71 are just below the plate 54. The pins 71 are shown in the advanced position. In this position the pins 71 extend into tubes 25 adjacent the tube to be sleeved.

In accordance with the invention the pins 71 are inserted and seated in the tubes 25 by applying low pressure (typically 15 psi) to the pistons 79 (FIG. 10A) of the associated cylinders 75. Once the pins are properly seated in the tubes, high pressure (750 psi) is applied. The high pressure disengages balls (not shown) from holding notches (not shown) causing an internal mechanism to rise, camming out keys 81, carried by each pin below tip 77, causing the keys to move outwardly and to engage the adjacent wall of a tube 25 firmly. With the keys 81 held against the wall of the tube by the high pressure, the pins effectively resist the reactive forces of insertion.

Figure 4:
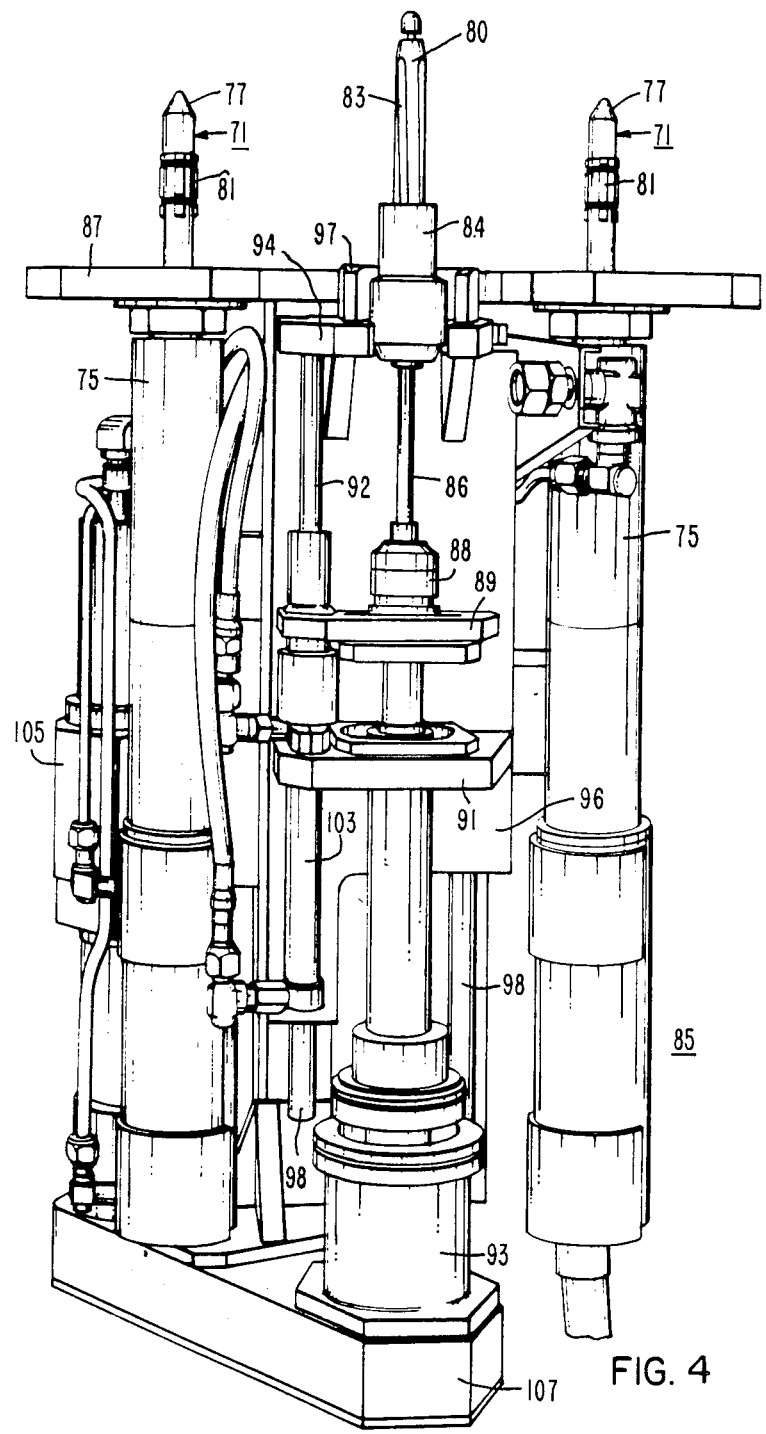
FIG. 4 is a copy of a photograph of the low hard-roller tool used in the practice of this invention with the telescoping mechanism for the tapered mandrel retracted so that the rolls of the roller are retracted from the surface of the cage.
Figure 5:
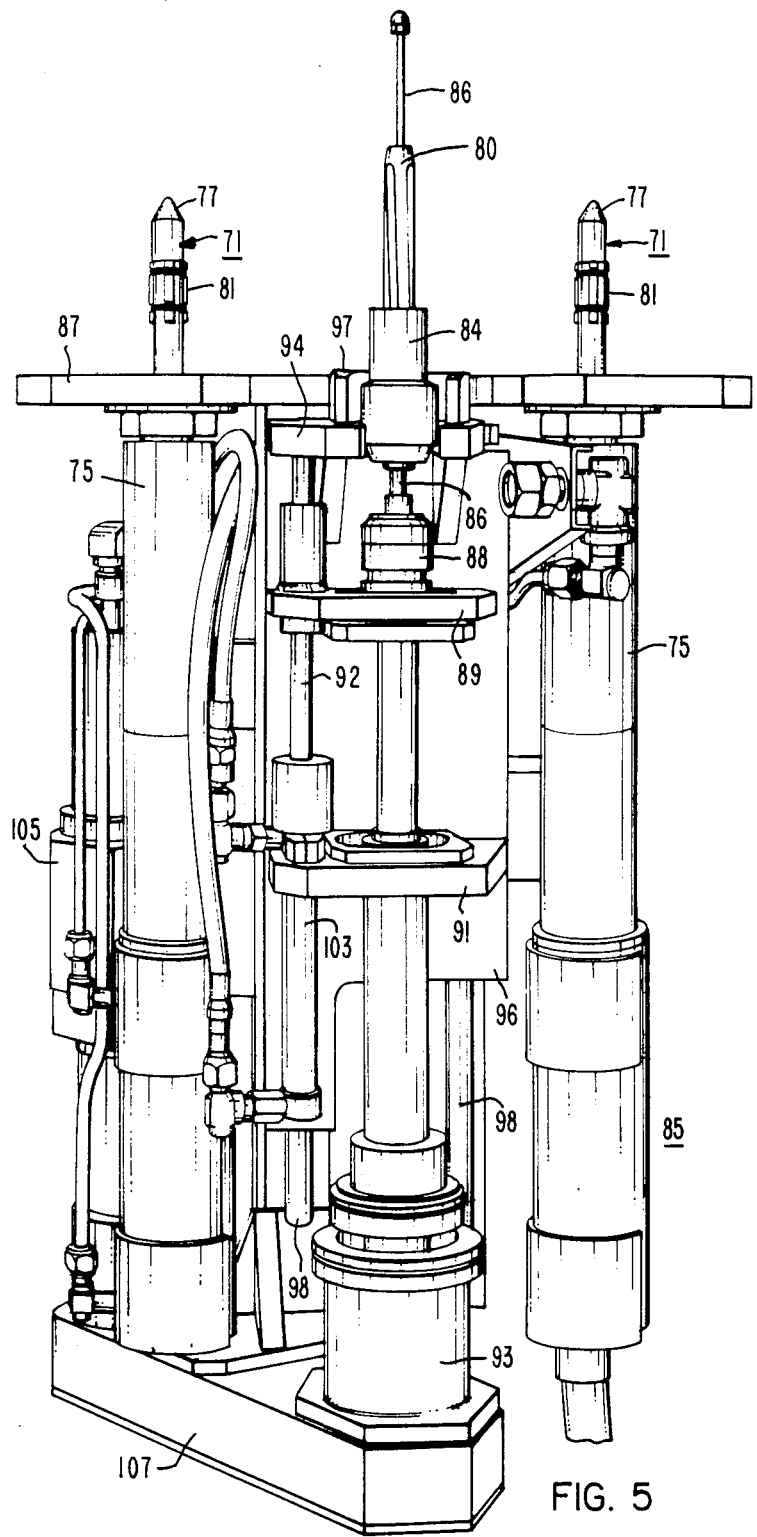
FIG. 5 is a copy of a photograph of this tool with the telescoping mechanism advanced so that the rolls are extended in rolling position.

Once the sleeve is positioned in the tube 25, the expanded portion of the sleeve within the tube sheet 23 is rolled by the lower rolls 83 (FIGS. 4 and 5) of tool 85. The reason for rolling this portion of the sleeve is to seal the sleeve to the tube 25.

Tool 85 includes a supporting frame (not shown) see Cooper-Vogeleer) from the top of which a horizontal plate 87 extends. A plate (not shown) with keyhole slots for mounting the tool on plate 39 (FIG. 1) is supported by the horizontal plate 87. Locking pins 71 and their cylinders 75 are mounted on each side of the plate 54. These locking pins 71 operate in the same manner as the locking pins for the sleeve inserter 51. The rolls 83 are in a cage 80 (referred to as a "tube" in Cooper-Vogeleer) which extends from a chuck 84. A tapered mandrel 86 extends from another chuck 88 on upper table 89. The table 89 is slidable on guide rods 92 which are mounted between a plate 94 extending below clamp 97 and a lower table 91. The upper plate 89, lower table 91 and the plate 94 are mounted on a vertical plate or carriage 96 which is movable on rails 98 vertically by a piston 268 of a hydraulic cylinder 100 (FIG. 10B). The plate or carriage 96 is movable from a lowermost position in which table 91 is just above cylinder 93 on the casing 107 (not to be confused with cylinder 100) to the position shown in FIG. 4. The upper table 89 is movable by the piston (not shown) of an air cylinder 103 to the upper position shown in FIG. 5. In this position, the mandrel 86 extends through the roller cage 83 and cams out the rolls 83 of the roller cage 85. The mandrel 86 is rotated by a hydraulic motor 105 through gears (not shown) in casing 107. The hydraulic motor 105 is started when the upward movement at table 89 is started after the cage and mandrel have been inserted in a sleeve 52. This motor rotates the mandrel 86 when it is started. When the mandrel drives up, it rotates the rolls 80, rolling the sleeve 52 into tube 25 within the tube sheet 23 substantially sealing the sleeve to the tube 25. The rolling is stopped by deenergizing motor 105 when a reactive torque of a predetermined magnitude is impressed on the rolls by the sleeve, tube 25 and tube sheet 23. Thereafter the motor 105 is reversed retracting the mandrel 86. After the mandrel is retracted the cage 80 and mandrel are returned to their starting position.

Figure 6:
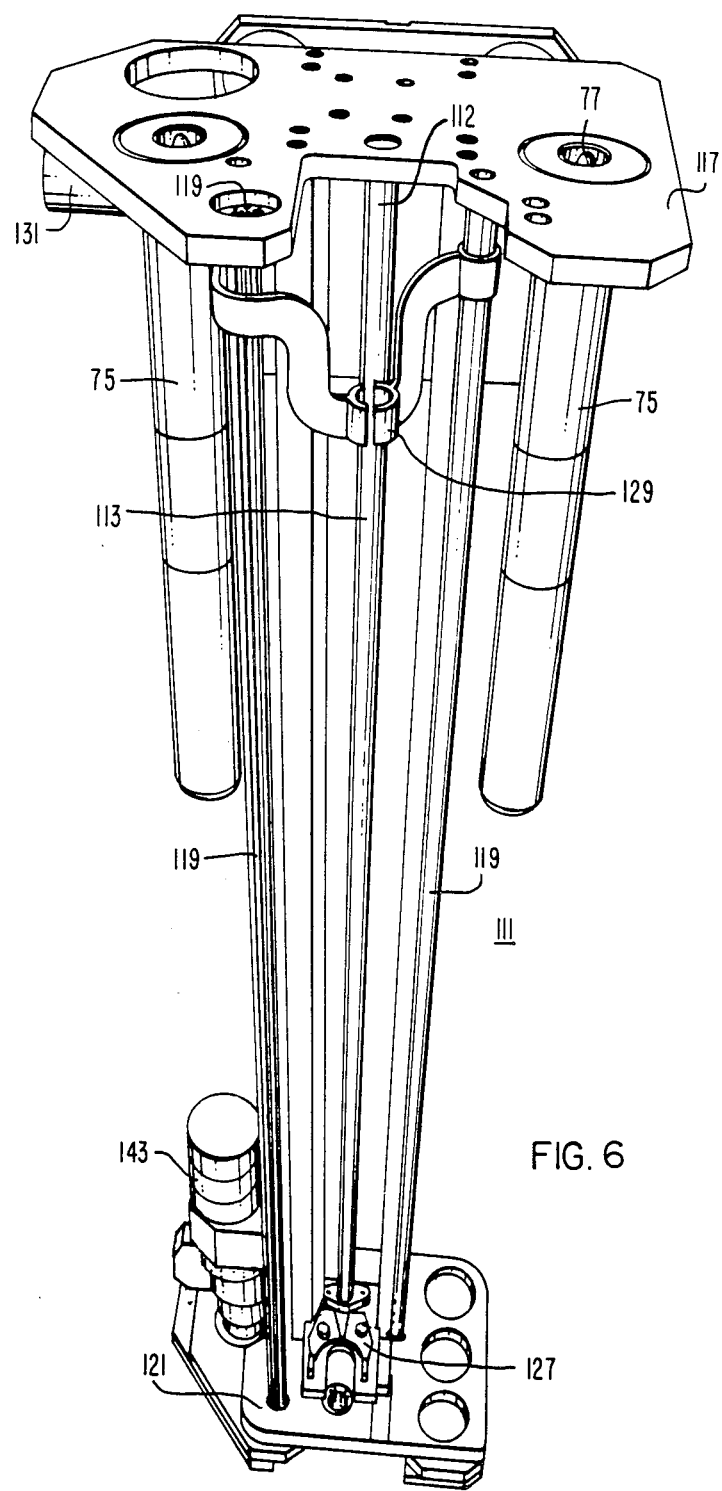
FIG. 6 is a copy of a photograph showing the upper hard roller in the retracted position.
Figure 7:
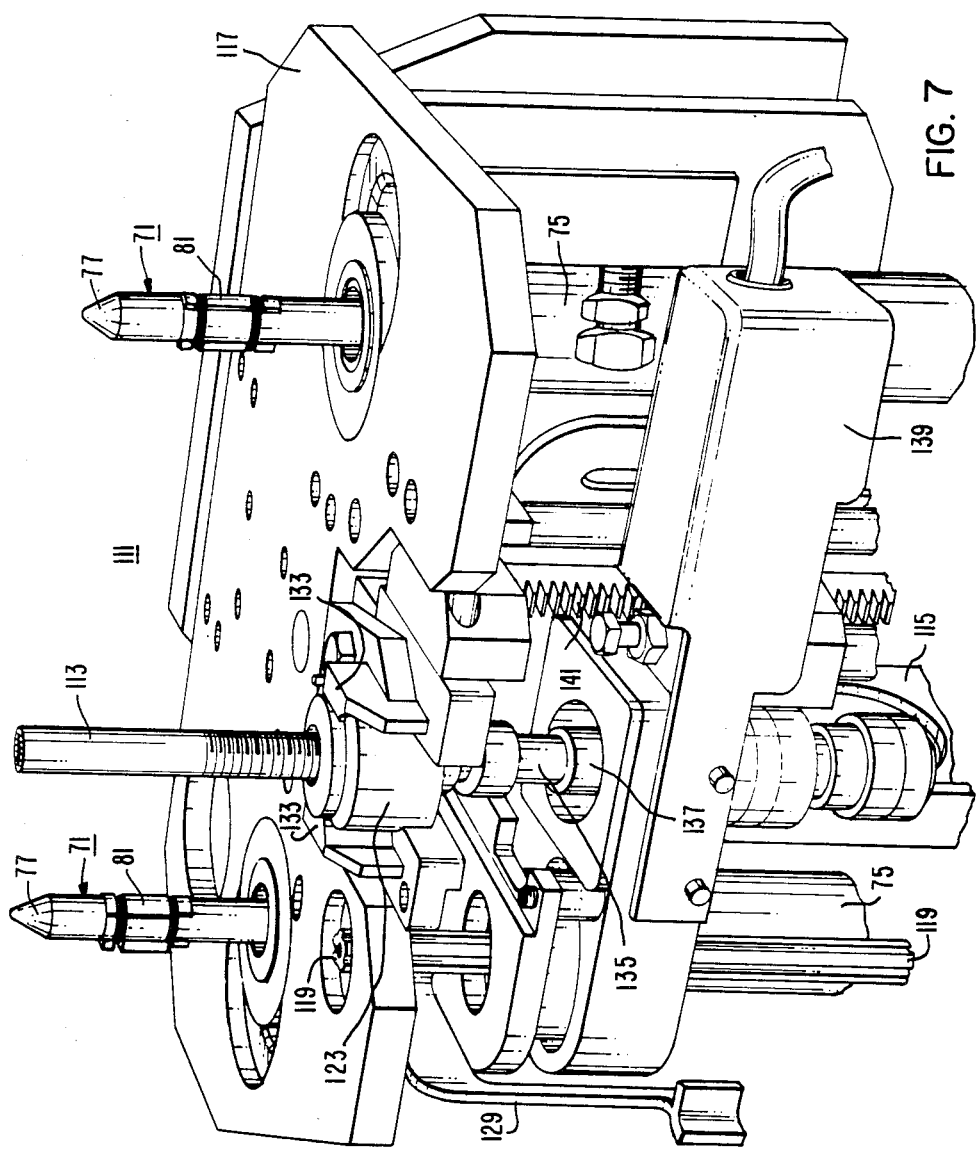
FIG. 7 is a copy of a photograph showing this roller in the rolling position.

The upper portion of the sleeve is rolled after the portion in the tube sheet 23. The tool 111 (FIGS. 6 and 7, also see Cooper-Vogeleer) for the upper rolls 112 which are in cage 113 (referred to as a tube in Cooper-Vogeleer) includes a frame 115 (FIG. 7). A horizontal plate 117 is mounted on the upper end of frame 115. The plate 117 supports a vertical plate (not shown) having keyhole slots for suspending the tool 111 from plate 39 (FIG. 1) of the coordinate transport 27. Splined rods 119 extend between horizontal plate 117 and a lower plate 121. The cage 113 is supported in a thrust collar or thrust bearing 123 (FIG. 7). In the retracted position of the upper roller, the cage 113 extends between the bracket or carriage 127 which is positioned just above lower plate 121 and top plate 117. The cage 113 is aligned and guided by fingers 129 which extend and are supported by splined rods 119. The bracket 127 has pins (not shown) which extend into the splines of the splined rods 119. The bracket 127 and the cage 113 connected to it are movable vertically by a 27 volt motor 131 (FIG. 6) which operates through a chain (not shown). The movement of bracket 119 is guided and stabilized by the splines. The splines are so shaped that as the bracket 119 is moved upwardly, the splined rods turn about their vertical axes exerting a camming effect on the fingers 119 rotating them out of the way of the bracket (FIG. 7). Clamps 133 are provided to clamp the thrust collar or thrust bearing 123 in the uppermost position. A tapered mandrel 135 (FIG. 7) extends vertically through cage 113. The mandrel 135 is supported in a chuck 137 in the bracket or carriage 127. When the cage 113 reaches the uppermost position, a motor in casing 139 is energized. The motor drives a pinion (not shown) which engages rack 141 to thrust the mandrel 135 through cage 113. The mandrel is tapered and cams out rolls (not shown) in cage 113. The mandrel is driven by hydraulic motor 143 (FIG. 6) through gears (not shown). When the upward movement of the mandrel is started, the rotation of motor 143 is started. As the mandrel moves upwardly, and while in its uppermost position, the mandrel causes the rolls 112 to rotate, rolling the sleeve 52. Since the sleeves are supported only by tube 25, it is necessary to limit the extension of the rolls into the sleeve to prevent blowout of the sleeve and tube. This is accomplished by a stop (not shown) on the thrust bearing that carries the cage 113. This stop engages a thrust bearing (not shown) on the mandrel 135 to stop the upward movement of the mandrel. To preclude overheating of the sleeve and tube 25, the use of the mandrel 135 and its dwell in the upper position is timed.

Another tool which is used in the practice of this invention is the drill tool 151 (FIG. 10A) for drilling out plugs 153. It is believed that a detailed description of the drill tool 151 is unnecessary for the understanding of this invention. Like the other tools 51, 85, 111, the drill tool 51 includes a support having a top plate through which the drill is projected into the plugs 153. The drill tool 151 also has locking pins 71 which are similar and are operated similarly to the locking pins 71 of the other tools. A tachometer 155 (FIG. 10A) provides a feedback signal from the drill. A vertical plate also extends from the horizontal plate with holds for mounting on plate 39 of the coordinate transport 27.

Figure 8:
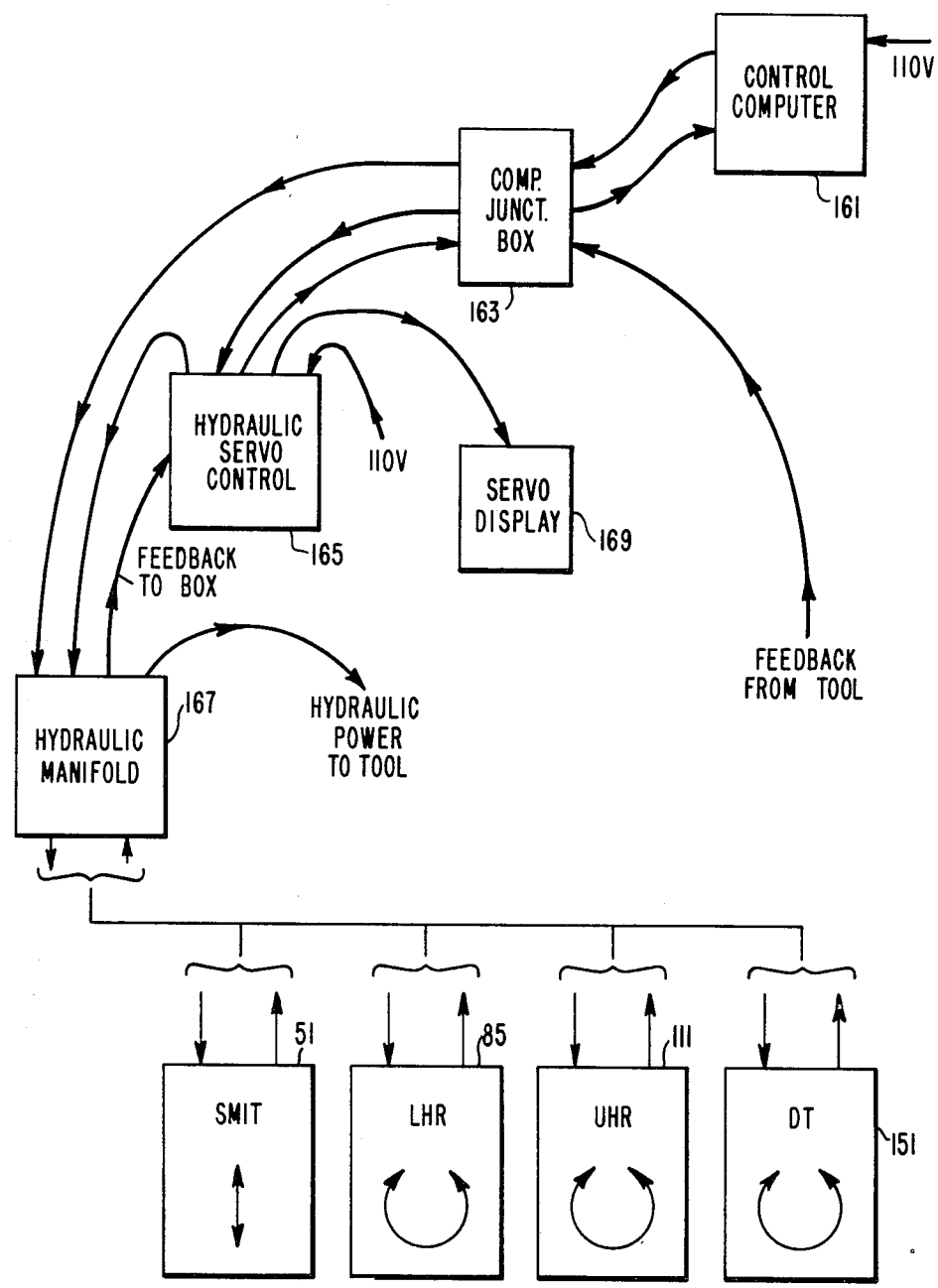
FIG. 8 is a block diagram showing the relationship of the various components which cooperate in the repair of the damaged tubes.

The control of the tools will now be described with reference to FIGS. 8, 9A, 9B, 10A and 10B. As shown in FIG. 8, the processing according to this invention is carried out under commands from a control computer 161. The commands from the control computer 161 are transmitted through the components junction box 163 to the hydraulic servo control (HSC) 165. Feedback from the hydraulic servo control is also transmitted to the computer 161 through the junction box 163. The hydraulic servo control (FIGS. 9A and 9B) is set to translate the commands from the computer into the desired operations of the tool which is carrying out a process and to process these commands in conjunction with the feedback signals to effectuate the carrying out of the operations. The control includes toggle switch S2 (FIG. 9A) setting the HSC for the tool to be operated, potentiometer P1 through P8 for setting the parameters of operation (speed and force) of the operating members or mechanisms of the tools, and relays K1 through K4 for initiating the operation of the tools. The HSC 165 is interfaced between the computer and the hydraulic manifold 167 as shown in FIG. 8. Signals from the computer 161 are translated by the HSC 165 into instructions transmitted to the hydraulic manifold 167 to regulate the speed, pressure and flow of the hydraulic fluid to the tools 51, 85, 111, and 151, i.e., in each case to the tool selected from operation. The parameters of the flow are fed back to the HSC 165. The apparatus also includes a display 169 for displaying the various parameters. In particular, the magnitude of the insertion force is displayed digitally. The display serves for process control and maintenance.

Figure 9A:
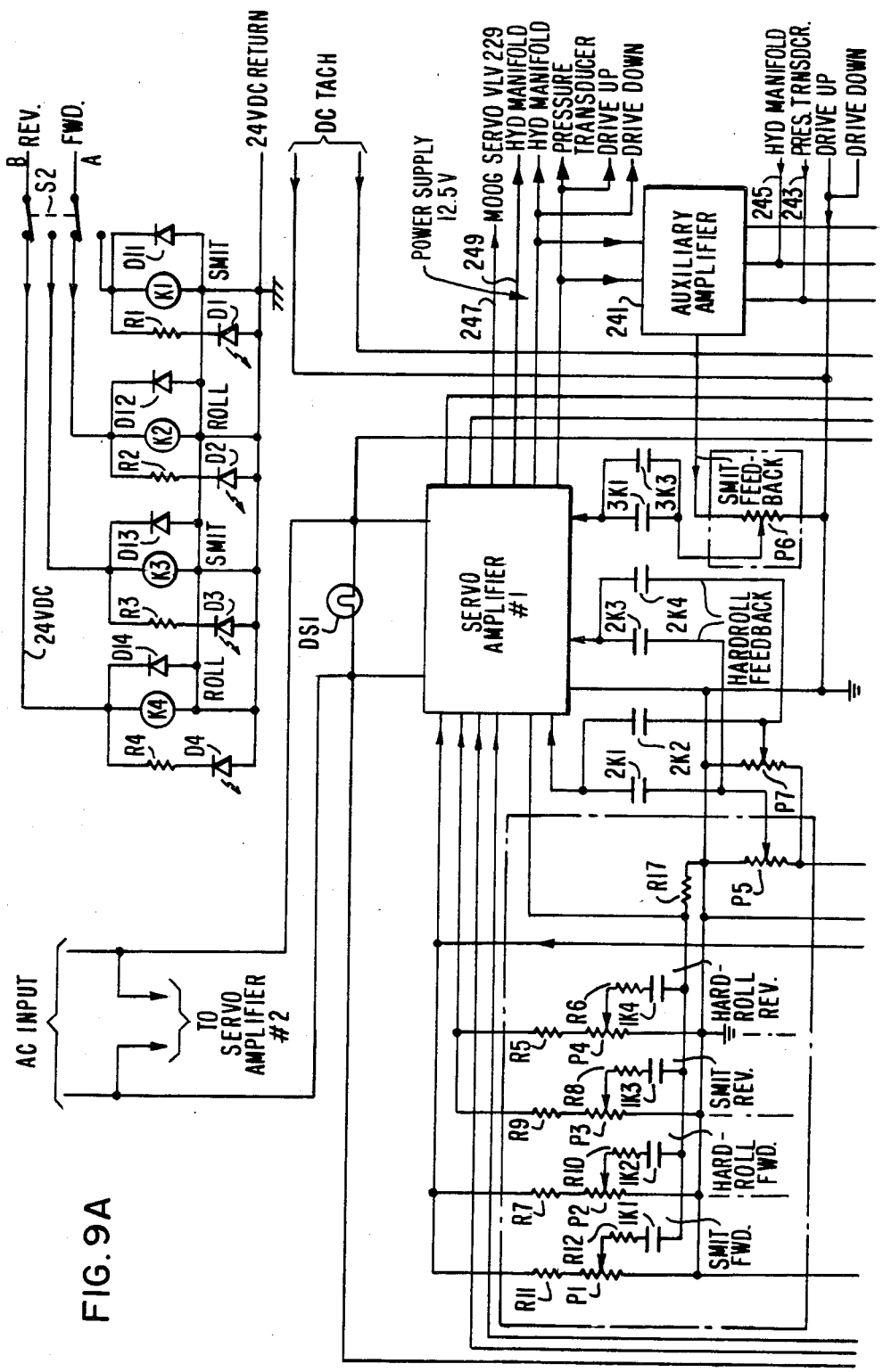
FIGS. 9A and 9B together constitute a schematic showing the electrical components with which the operation of the tools for repairing the damaged tubes are set.
Figure 9B:
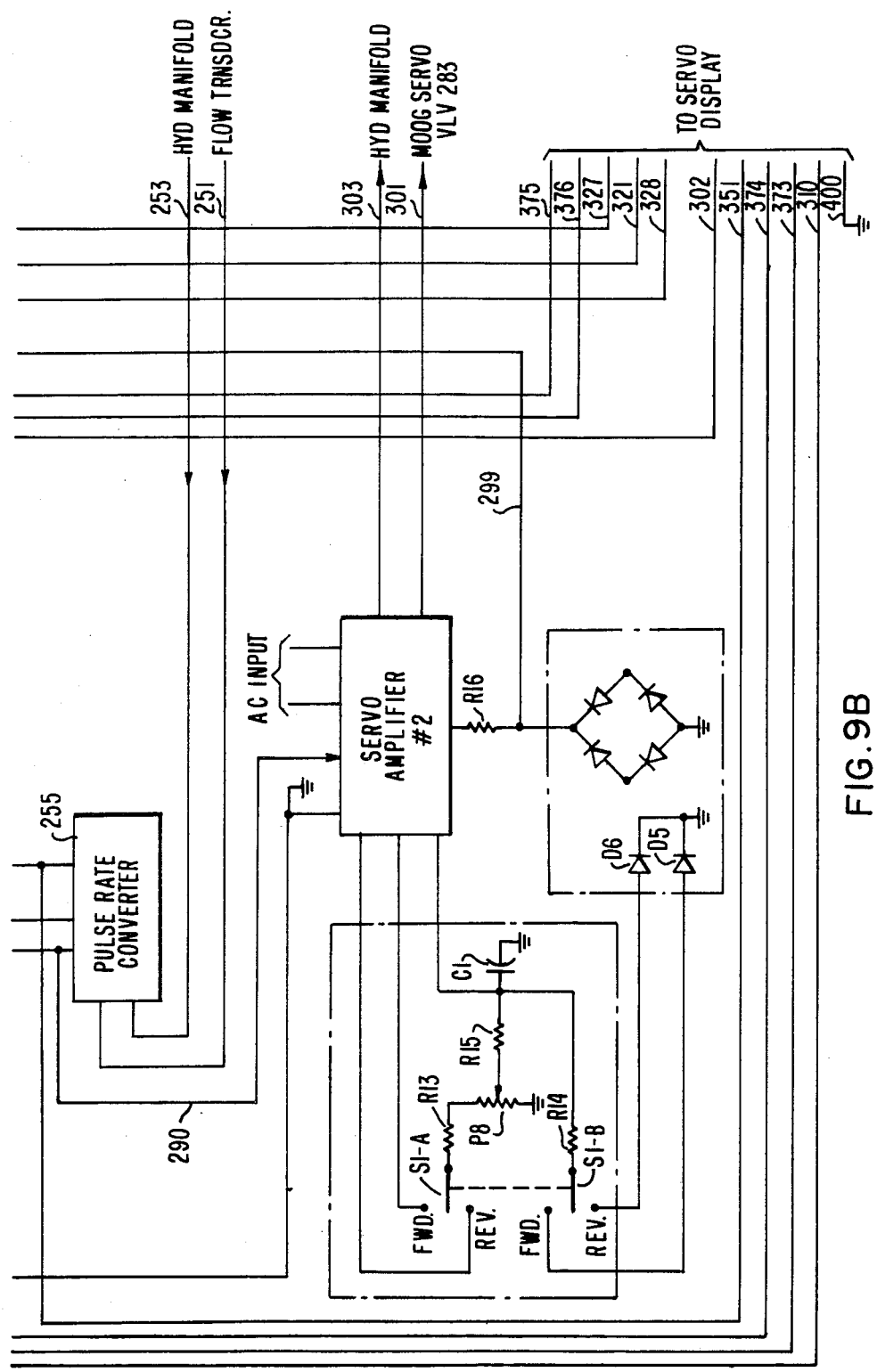

Essentially the hydraulic servo control includes the electrical apparatus shown in FIGS. 9A and 9B. The switch S2 is shown set for hard rolling both high and low. In this setting relays K2 and K4 are selectively energized depending on the command from computer 161. When the computer calls for forward drive, current flows through terminal A, K2 is energized and front contacts 1K2 and 2K2 are closed. Potentiometer P2 is set to set the pressure on the motor 143. Contact 1K2 connects potentiometer P2 to servo amplifier 1 to set the force impressed by motor 143 for the rolling. Servo amplifier 1 is a Moog amplifier 121A132. Contact 2K2 connects potentiometer P7 to servo amplifier 1 to set the speed of the rolling. Potentiometer P7 is preset and locked in the preset setting. The setting is selected to preclude unstable operation because of the interaction of the pressure transducers PT1 and PT2 (FIG. 10A), which together are responsive to the force impressed on the motor 143, and the flow transducer FT which responds to the flow of fluid through the motor which determines the speed of the motor.

When the computer commands current to be impressed at terminal B (and not at A), relay K4 is energized and contacts 1K4 and 2K4 are closed. Motor 143 is reversed. The force impressed by the motor is now set by potentiometer P4. The speed continues to be set by P7.

In the lower position, the switch S2 is set to connect terminals B and A for sleeve mandrel insertion tool (SMIT). When the computer calls for current at terminal A, relay K1 is energized and contacts 1K1, and 2K1 and 3K1 are closed. Potentiometers P1, P5 and P6 are connected to servo amplifier 1. The motor 61 (FIG. 1) is driven in the forward direction inserting the sleeve blank in a tube 25. The force of the motor is set by potentiometer P1. The speed of the motor 61 is set by potentiometer P5 which is set and locked in the setting to preclude instability. Potentiometer P5 sets the feedback from the flow transducer FT. Potentiometer P6 sets the feedback from the pressure transducers PT1 and PT2.

When the motor 61 is to be reversed, current is supplied to terminal B (and not A), relay K3 is energized and contacts 1K3, 2K3 and 3K3 are closed. Potentiometers P3, P5 and P6 are connected to set the reverse operation of the motor 61.

The drill tool is controlled through servo amplifier 2 also a Moog 121A132. The force exerted by the drill is set by potentiometer P8. The potentiometer is set for forward and reverse operation by ganged switches S1-A and S1-B.

Diodes D1, D2, D3, D4 are LED's which indicate when the corresponding relays K1, K2, K3, K4 are energized. The circuit shown in FIGS. 9A and 9B is energized from a low voltage supply typically about 24 to 27 volts.

Figure 10A:
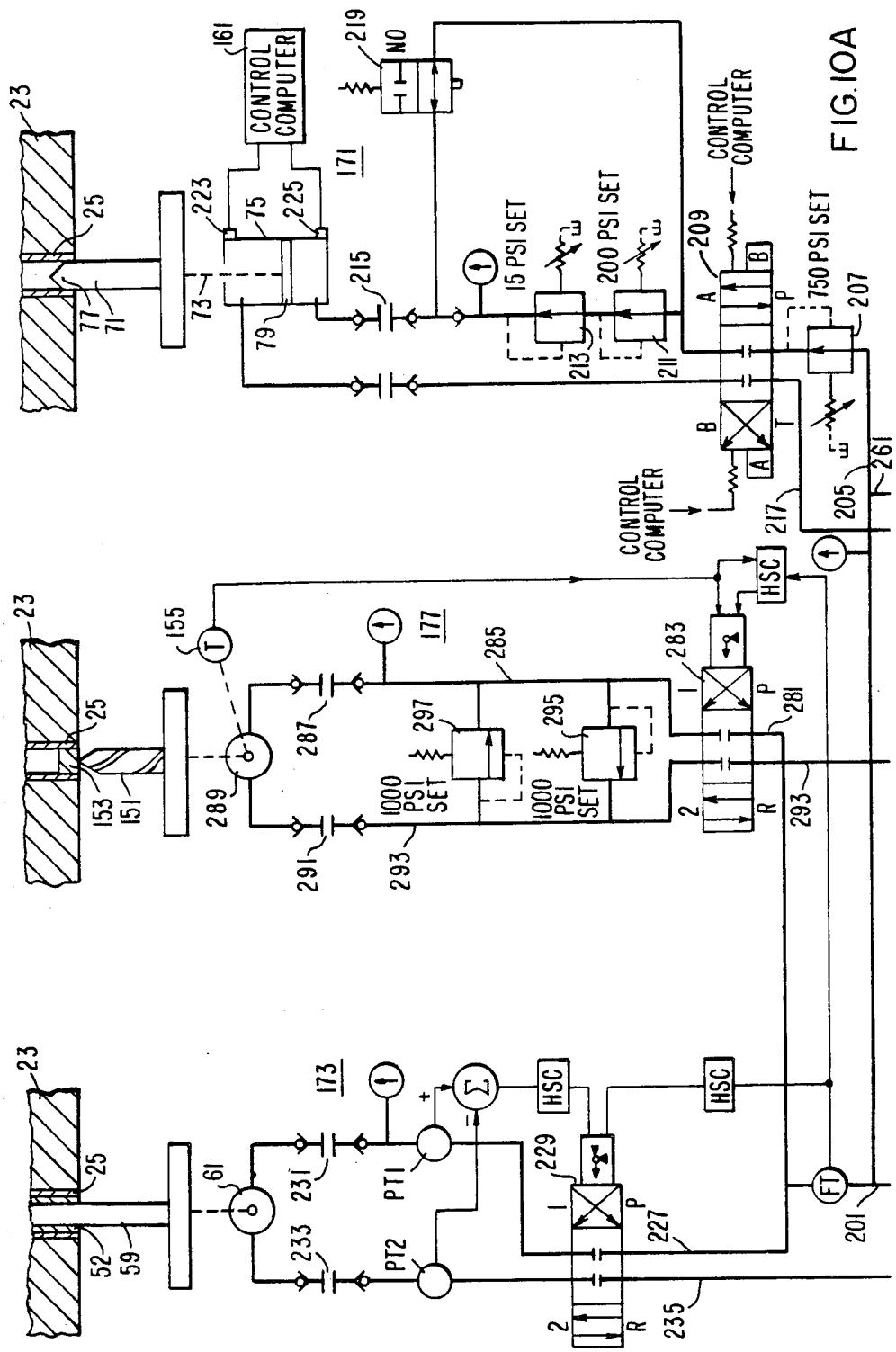
FIGS. 10A and 10B together constitute a schematic showing the control of the tools including the control of the locking pins in the practice of this invention.
Figure 10B:
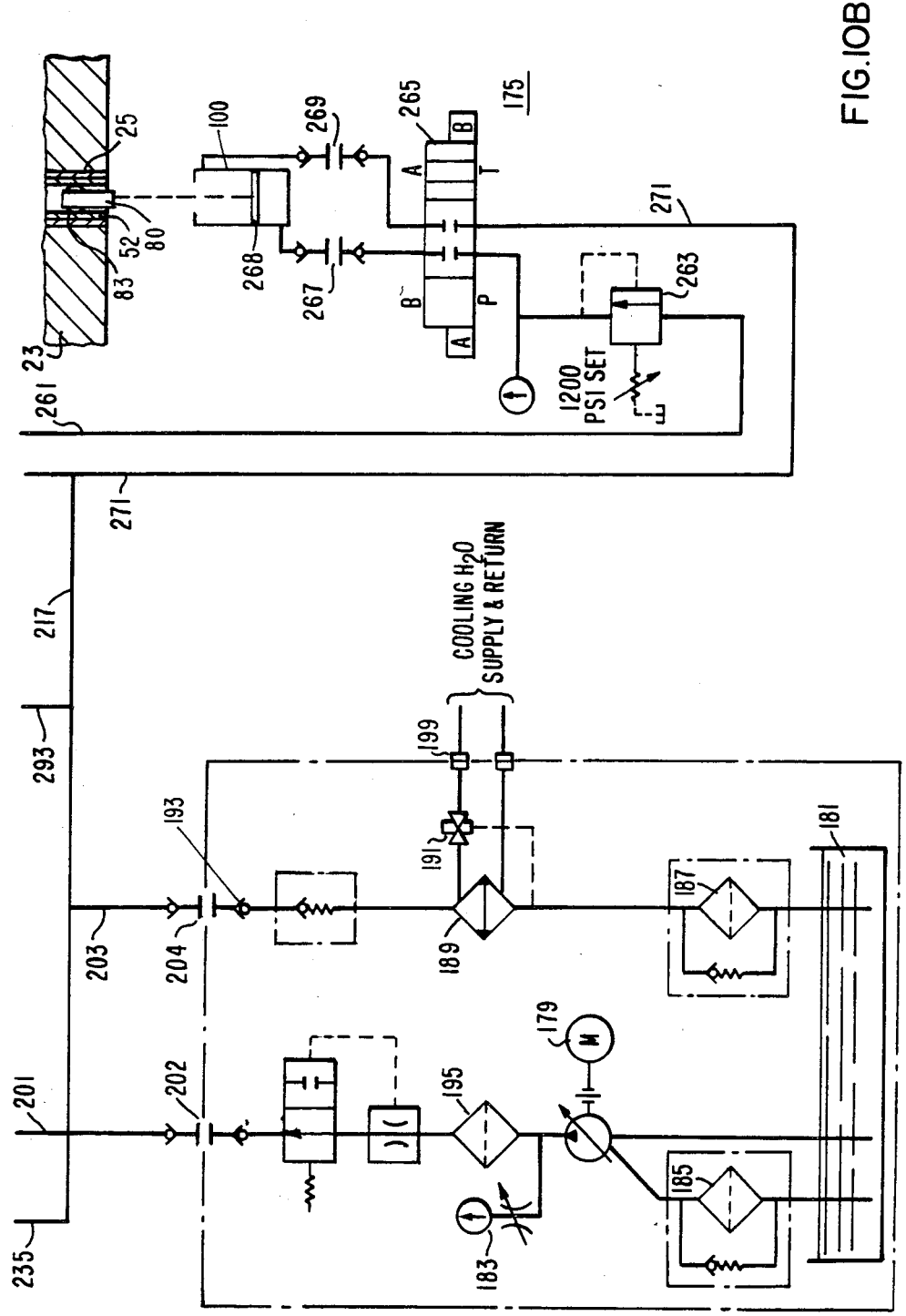

FIGS. 10A and 10B show the hydraulic fluid circuits 171, 173, 175, 177, respectively, for the drive for the locking pins 71 in accordance with this invention, the insertion drive for the SMIT 51, the rotating drives for the lower and upper rollers 85 and 111, the insertion drive for the lower roller 85 and the rotating drive for the drill 151. These circuits are supplied from a pump 179 (FIG. 10B). To the extent that they may be of interest, the components shown in FIG. 10B, associated with the pump, are as follows:

181 fluid tank typically 40 gallons
183 pressure gauge
185 line filter
187 line filter
189 heat exchanger
191 water regulator valve
193 check valve
195 pressure filter
202-204 quick disconnects
199 connector The various circuits are for convenience shown as connected to HSC blocks. The blocks are vertically integrated in the HSC 165 and shown in FIGS. 9A and 9B.

The fluid for the drives is derived from main lines 201 and 203 through quick disconnects 202 and 204. The fluid for the locking pin cylinders 75 (FIG. 10A) is supplied from line 201 through conductor 205, pressure regulator 207, directional control valve 209, regulator 211, regulator 213, disconnect 215 to the cylinder. The fluid is returned to line 203 through directional valve 209 and conductor 217. Regulators 207, 211 and 213 and directional control valve 209 are located in the hydraulic manifold 167 (FIG. 8). Typically the pressure in lines 201 and 203 is about 1200 to 1500 psi. Regulator 207 reduces the pressure, typically to 750 psi, returning the excess fluid back to the supply. The regulator 211 reduces the pressure typically to 200 psi and the regulator 213 reduces the pressure, typically to 15 psi. The regulators 211 and 213 are bypassed by a solenoid valve 219 when it is open. Valve 219 is in the hydraulic manifold. In the open setting of valve 219, the pressure applied to cylinder 75 is typically of the order of 750 psi. In setting A, i.e., with solenoid A energized, valve 209 is set to supply fluid below piston 79 to drive the locking pins 71 into a tube 25. In the B setting of valve 209, i.e., with solenoid B energized, the fluid flows in through conductor 217 and back through conductor 205. In this case, the piston 79 is retracted and the locking pin 71 is withdrawn from the tube 25. A pair of locking pins 71 and the associated control parts 209, 211, 213, 219 and a piston 75 are provided for each tool 51, 85, 111 and the drill.

On an appropriate signal from computer 161, solenoid A for each locking pin and the solenoid of valve 219, for the tool which is mounted on the coordinate transport 21, are energized so that valve 219 is closed. The locking pins 71 are then advanced slowly into tubes 25 and are properly seated. When the pins 71 are fully advanced, limit switch 223 is actuated sending a signal to computer 161. At the command of the computer, solenoid valve 219 is deenergized and regulators 211 and 213 are bypassed. High pressure, typically of the order of 750 psi, is applied to the locking pins and the keys 81 (FIGS. 2, 3) are projected outwardly securing the locking pins in the tubes 25. The required operation is then carried out. When the operation is completed, solenoid B of the directional control valve 209 of each locking pin is energized. The flow of fluid is reversed and the pistons 79 and locking pins 71 are retracted. When the pistons reach the fully retracted positions, limit switch 225 is actuated, sending a signal to the computer that the tool may be removed.

The control of the tools 51, 85, 111, and 151 used in the repair of damaged tubes constitutes the subject matter of a divisional application. In the interest of facilitating the understanding of this invention this control is described here.

The motor 61 for the SMIT 51, the motor 105 for the lower hard roller of tool 85, and the motor 143 for the upper hard roller of tool 111, each is supplied in the forward direction from line 201, through flow transducer FT, conductor 227, servo valve 229, pressure transducer PT1, disconnect 231, motor 61, disconnect 233, pressure transducer PT2, servo valve 229, conductor 235, to line 203. In the reverse direction, the flow is from line 203 to line 201 along a like path. In position R the servo valve 229 passes fluid in the forward direction and in position P in the reverse direction.

The transducers PT1 and PT2, and FT and servo control valve 229, are in the hydraulic manifold 167 (FIG. 8). The transducers produce electrical voltage signals, in dependence upon the pressure and flow. The feedback signal to the hydraulic servo control 165 is, as shown in FIGS. 10A and 10B, the difference between the signal from PT1 and the signal from PT2. This difference signal measures the pressure across the motor 61 and is impressed on the auxiliary amplifier 241 (FIG. 9A) in the hydraulic servo control through conductors 243 and 254. The auxiliary amplifier is a Moog 123-127. The output of auxiliary amplifier 241 is impressed as an input on servo amplifier 1 through potentiometer P6 and either contacts 3K1 or 3K3 depending on whether the flow is forward or reverse. In servo amplifier 1 the feedback signal derived from auxiliary amplifier 241 is compared with the command signal from potentiometer P1 or P3 as the case may be. The output of servo amplifier 1 which is the error signal is impressed on servo valve 229 through conductors 247 and 249. The response of servo valve 229 is a continuous function of the error signal; the control of the insertion force is smooth so that the sleeve blank is moved without undesired interruptions or jerks into a tube 25.

The feedback signal from the flow transducer FT is a pulse of variable frequency. This signal is impressed, through conductors 251 and 253 (FIG. 9B), on a pulse-rate converter 255 which converts the pulses into a voltage dependent on the frequency of the pulses. The pulse-rate converter 255 is a PRC pulse rate converter 101-KY of Flow Technology Inc., Phoenix, AZ. If the apparatus is set for SMIT, the resulting voltage signal is impressed through contact 2K1 on servo amplifier 1 through potentiometer P5 if the flow is forward and through 2K3 if the flow is reverse. If the apparatus is set for upper or lower hard rolling, the signal is impressed on servo amplifier 1 through potentiometer P7 and contact 2K2, if the flow is forward, and contact 2K4 if the flow is reverse. Potentiometers P5 and P7 are set so that the operation is stable and locked in this setting. In this case also the output of servo amplifier 1 is impressed on the servo valve 229.

For low hard rolling the cage or tube 113 and the mandrel 86 are advanced into the sleeve by a hydraulic cylinder 100 (FIG. 10B) rather than a low-voltage motor as is the case for high hard rolling. A hydraulic cylinder is suitable for this purpose because the displacement of the cage 80 and mandrel 86 is relatively short.

To advance the cage 80 and mandrel 86 into the sleeve 52 in a tube 25, the cylinder 100 of the lower hard-roll tool is supplied in a fluid circuit from line 201, through conductor 205, conductor 261, pressure regulator 263, directional control valve 265, disconnect 267, cylinder 100 (below piston 268), then from above piston 268 through disconnect 269, valve 265, conductor 271, conductor 217 to line 203. Directional control valve 265 is identical to directional control valve 209. Regulator 263 blocks the flow of fluid to the cylinder 100 until the pressure of the fluid is a preset magnitude, typically 1200 psi. The fluid flows forwardly, in the circuit traced above, with solenoid A of the valve 265 energized and reversely with solenoid B energized. The regulator 263 and the directional control valve 265 are in the hydraulic manifold 167 (FIG. 8).

The drill tool is supplied in a circuit extending from line 201, through the flow transducer FT, conductor 281, servo control valve 283, conductor 285, disconnect 287, drill motor 289, disconnect 291, servo control valve 283, conductor 293, conductor 217 to line 203. Servo control valve 283 is identical to servo control valve 229 and like the latter is in the hydraulic manifold 167. Regulators 295 and 297 are connected oppositely between conductors 285 and 293. Their purpose is to protect the motor 289 from excessive pressure. If the pressure in the forward direction exceeds a predetermined magnitude, typically 1000 psi, regulator 295 bypasses the motor. If the pressure in the reverse direction exceeds the magnitude, regulator 297 bypasses the motor 289. The regulators 295 and 297 are in the manifold 167 (FIG. 8).

The supply to motor 289 is regulated by feedback from tachometer 155 and from the flow transducer FT (FIGS. 10A and 10B). The tachometer output is impressed on servo amplifier 2 (FIGS. 9A and 9B) through conductor 299 and resistor R16. The signal from the flow transducer FT converted by the pulse-rate converter, is also impressed on servo amplifier 2 through conductor 290. Servo amplifier 2 is a Moog 121A132. The feedback signal from the tachometer is compared to the preset magnitude from potentiometer P8 in servo amplifier 2. The resulting error signal is impressed on servo control valve 283 through conductors 301 and 303. The signal from the flow transducer FT serves as a secondary check that the flow meets the demand set in the computer 161. The effect of this control by the flow transducer and the tachometer 155 governed by computer 161 is to maintain the speed-to-feed ratio of the drill constant. The computer sets the drive up voltage so that the chip-cut depth per revolution of the drill 151 is constant, typically about 0.127 millimeters per revolution. It is desirable to maintain constant speed-to-feed ratio because by this process maximum efficiency is achieved, i.e., there is a maximum material-removal rate with a minimum cutting-edge wear and power consumption.

The conductors 375, 376, 327, 321, 328, 302, 351, 374, 373, and 310 (FIGS. 9A and 9B) supply intelligence to the servo display 169 (FIG. 8). Conductor 400 provides a common ground for the display.

While a preferred embodiment of this invention have been disclosed herein, many modifications thereof are feasible. This invention is not to be restricted except insofar as is necessitated by the spirit of the prior art.

We claim:

1. The method of suspending a tool, which serves to process the damaged tubes of a steam generator of a nuclear-reactor plant, either to prepare said tubes for insertion of a sleeve blank or to insert a sleeve blank, or to treat a sleeve after it is inserted in a tube, the said tube extending into the tube sheet of said steam generator, the said tool having a plurality of locking pins for engaging tubes of said generator adjacent to a damaged tube to be processed, the said method being practiced with apparatus including means, connected to said locking pins, for supplying fluid under pressure to insert and hold said locking pins, the said method comprising, supplying said fluid to said inserting means at a low pressure to insert said locking pins into said adjacent tubes at a low velocity, to seat said locking pins in said adjacent tubes properly, and, once said locking pins are seated in said adjacent tubes, increasing the pressure of said fluid to a high magnitude so that said locking pins are held firmly in said adjacent tubes, resisting removal by the reactive force of the processing.

2. The method of suspending a tool, which serves to process the damaged tubes of a steam generator of a nuclear-reactor plant, either to prepare said tubes for insertion of a sleeve blank or to insert a sleeve blank, or to treat a sleeve after it is inserted in a tube, the said tube extending into a tube sheet of the generator, the said tool having a plurality of locking pins for engaging tubes of said steam generator adjacent to said damaged tube to be processed, the said method comprising, impressing a low force on said locking pins to insert said locking pins into said adjacent tubes by moving said locking pins into said adjacent tubes at a low velocity so that said locking pins seat properly in said adjacent tubes and, once said locking pins are seated in said adjacent tubes, impressing a high force on said locking pins to hold said locking pins in said adjacent tubes so that the locking pins resist removal by the reactive force of the processing.

3. Apparatus for processing the damaged tubes of a steam generator of a nuclear-reactor plant, either to prepare said tubes for insertion of a sleeve blank or to insert a sleeve blank, or to treat the sleeve after it is inserted, the said tubes extending into a tube sheet of the generator, the said apparatus including a tool having locking pins for supporting said tool from tubes of said tube sheet adjacent to a tube to be processed, fluid-actuable means, connected to said locking pins, for inserting said locking pins in said adjacent tubes, a fluid supply supplying fluid at a high pressure, means interconnected between said fluid supply and said fluid-actuable means for conducting fluid from said supply to said fluid-actuable means to insert said locking pins in said adjacent tubes, said fluid-conducting means including fluid-pressure-regulator means for reducing the pressure of the fluid supplied to said fluid-actuable means, while said locking pins are being inserted in said adjacent tubes, to a low magnitude so that said locking pins are inserted in said tubes at a low velocity, whereby said locking pins are properly seated in said tubes, and means, responsive to the seating of said locking pins in said adjacent tubes, for bypassing said fluid-pressure-regulator means so that after said locking pins are inserted in said adjacent tubes, high pressure is impressed on said locking pins to hold said locking pins in said adjacent tubes, so that said locking pins resist being pulled out by the reactive force of the processing of the tube being processed.

* * * * *